(12) United States Patent
Dean et al.

(10) Patent No.: US 10,701,093 B2
(45) Date of Patent: Jun. 30, 2020

(54) ANOMALY ALERT SYSTEM FOR CYBER THREAT DETECTION

(71) Applicant: DARKTRACE LIMITED, Cambridge (GB)

(72) Inventors: Tom Dean, Cambridge (GB); Jack Stockdale, Cambridge (GB)

(73) Assignee: Darktrace Limited, Cambridge (GB)

( * ) Notice: Subject to any disclaimer, the term of this patent is extended or adjusted under 35 U.S.C. 154(b) by 0 days.

(21) Appl. No.: 15/425,906

(22) Filed: Feb. 6, 2017

(65) Prior Publication Data

US 2017/0230392 A1    Aug. 10, 2017

(30) Foreign Application Priority Data

Feb. 9, 2016  (GB) .................... 1602309.5

(51) Int. Cl.
*H04L 29/06* (2006.01)
*G06F 21/55* (2013.01)

(52) U.S. Cl.
CPC ........ *H04L 63/1425* (2013.01); *G06F 21/552* (2013.01); *H04L 63/1441* (2013.01)

(58) Field of Classification Search
CPC ................ H04L 63/1425; H04L 63/1441
See application file for complete search history.

(56) References Cited

U.S. PATENT DOCUMENTS

| | | | | |
|---|---|---|---|---|
| 6,078,851 A * | 6/2000 | Sugitani | ................ | B62D 15/02 701/30.6 |
| 7,448,084 B1 | 11/2008 | Apap et al. | | |
| 9,462,009 B1 * | 10/2016 | Kolman | .............. | H04L 63/1425 |
| 2004/0167893 A1 | 8/2004 | Matsunaga et al. | | |
| 2005/0065754 A1 * | 3/2005 | Schaf | ................ | B60Q 10/0635 702/188 |
| 2007/0294187 A1 * | 12/2007 | Scherrer | ............. | G06Q 20/401 705/75 |

(Continued)

FOREIGN PATENT DOCUMENTS

| | | | |
|---|---|---|---|
| EP | | 2922268 A1 | 9/2015 |
| WO | WO 2008/121945 A2 | | 10/2008 |

OTHER PUBLICATIONS

Search Report under Section 17(5) issued by the Intellectual Property Office dated Jul. 19, 2016 for Application No. GB1602309.5, 3 pages.

(Continued)

*Primary Examiner* — Michael Pyzocha
(74) *Attorney, Agent, or Firm* — Rutan & Tucker, LLP

(57) ABSTRACT

Disclosed herein is a method for use in detection of anomalous behavior of a device of a computer system. The method is arranged to be performed by a processing system. The method includes deriving values, $m_1, \ldots, m_N$, of a metric, M, representative of data associated with the device; modeling a distribution of the values; and determining, in accordance with the distribution of the values, the probability of observing a more extreme value of the metric than a given value, m, of the metric, wherein the probability is used to determine whether the device is behaving anomalously. Also disclosed is an equivalent computer readable medium and anomalous behavior detection system.

20 Claims, 2 Drawing Sheets

(56) References Cited

U.S. PATENT DOCUMENTS

| | | | |
|---|---|---|---|
| 2009/0106174 A1* | 4/2009 | Battisha | H04L 41/0681 706/12 |
| 2012/0209575 A1* | 8/2012 | Barbat | G06F 17/5009 703/2 |
| 2012/0284791 A1 | 11/2012 | Miller et al. | |
| 2012/0304288 A1* | 11/2012 | Wright | G06F 21/552 726/22 |
| 2013/0198119 A1* | 8/2013 | Eberhardt, III | G06N 99/005 706/12 |
| 2014/0007237 A1 | 1/2014 | Wright et al. | |
| 2014/0074762 A1* | 3/2014 | Campbell | G06Q 40/00 706/46 |
| 2015/0081431 A1* | 3/2015 | Akahoshi | B60Q 30/0254 705/14.52 |
| 2015/0161394 A1 | 6/2015 | Ferragut et al. | |
| 2015/0207696 A1* | 7/2015 | Zhang | H04L 41/5009 709/224 |
| 2015/0379110 A1* | 12/2015 | Marvasti | G05B 23/0227 707/740 |
| 2016/0062950 A1* | 3/2016 | Brodersen | G06F 17/18 702/181 |
| 2016/0065604 A1* | 3/2016 | Chen | H04L 63/1425 726/23 |
| 2016/0241576 A1* | 8/2016 | Rathod | H04L 63/1425 |
| 2016/0373476 A1* | 12/2016 | Dell'Anno | G06F 17/30563 |
| 2017/0169360 A1* | 6/2017 | Veeramachaneni | G06N 99/005 |

OTHER PUBLICATIONS

Extended European Search Report dated Apr. 13, 2017 issued for Application No. EP17155356.3 (7 pages).

* cited by examiner

ANOMALY ALERT SYSTEM FOR CYBER THREAT DETECTION

PRIORITY

This application claims the benefit of Great Britain Application No. GB 1602309.5 filed Feb. 9, 2016, the entire contents of which are hereby incorporated by reference for all purposes.

FIELD

An unsupervised anomaly detection algorithm and its application to the field of cyber threat detection is disclosed. More specifically, but not exclusively, a method for calculating the probability that a device is behaving anomalously is disclosed.

BACKGROUND

As of late 2015 the issue of cyber attacks has, after a series of high profile and damaging hacks, become one of the leading security concerns for both corporations and nation states. As a result the field of cyber security has become increasingly important. Traditional approaches to cyber security rely on signature based approaches where a system is built that looks for behaviors that match those of previously seen attacks. However, these methods fail to offer protection against so called zero-day attacks where an adversary uses a previously unknown exploit to compromise a computer or network.

Traditional deterministic approaches are reliant on the assumption that the difference between what is legitimate activity and what is illegitimate activity can be defined. An expanding set of corporate policy and rules have been written to identify client programs as either compliant or not compliant. However, such deterministic approaches require a vast amount of effort to be spent in constantly updating these rules and signatures, in an attempt to stay up to date with the changing threat environment. The definition of what is legitimate is based on what is known about past attacks. For each successful intrusion, a new rule is written, the signature is updated and the next time that same threat presents itself, access is denied or challenged. This method is effective in defending against known threats that have already been identified. However, it is incapable of responding to fresh threats that are constantly presenting either through minor adjustments to existing vectors or more significant evolution of attack methods. Consequently, current threat detection and prevention systems are still being compromised and are unable to keep out threats.

Furthermore, as the technical defenses that protect our data have become more sophisticated, attackers have increasingly turned their attention to the softest part of the network, the user. Socially-engineered attacks account for over 85% of espionage threat, and were the fastest-growing attack vector of 2012. Attackers use subtle and sophisticated methods to manipulate human users to unwittingly install attacks on their behalf, and traditional technical defenses are rendered impotent within a process where a legitimate user has decided to click on a link in a 'weaponized' email or visited a familiar yet now compromised website. These new forms of attack make the problem of detecting threats even harder.

SUMMARY

A cyber threat detection system for computer networks is disclosed. More specifically, a cyber threat detection system that incorporates both a method for detecting potentially malicious network activity and a method for representing the output of anomaly detection algorithms to non-expert users is disclosed.

The inputs of the system may be measurements of network activity which may be generated by a network traffic monitoring system that is capable of extracting the metadata of packets moving across the network. These measurements of network activity may typically be quantities such as number of packets sent between two endpoints, volume of data transferred, number of connections established etc.

The system may work in several stages. In the first stage the measurements of network activity may be processed to produce behavioral metrics. Two different types of metric may be computed:

Metrics that are simple functions of past and present values of the measurements of the network activity. These may be; the raw measurements, moving averages/exponentially weighted averages of the measurements, well known mathematical functions of the measurements such as square root and logarithm and moving averages/exponentially weighted averages of well known mathematical functions of the measurements.

Metrics that are the outputs of anomaly detection algorithms applied to the first type of metric. Some examples of anomaly detection algorithms used are; one class support vector machine (SVM), local outlier factor and probabilistic outlier modelling.

The first type of metrics may be referred to as network metrics and the second type as derived metrics.

In the second stage of the system time series data of each individual behavioral metric may be analyzed and a mathematical model of what is considered to be normal behavior for that metric may be constructed for each device on the network. The third stage of the system may comprise analyzing the activity of each network device in real time to detect anomalous behavior. This may be done by first processing the new network activity measurement of each device to compute the values of the corresponding behavioral metrics. These values may then be analyzed to see how anomalous the value of each metric is. Finally the levels of anomalousness of the values of each behavioral metric of a device may be combined to produce a measure of the overall anomalousness of the behavior of each device. Network system administrators/security officers may be sent alerts about any device whose behavior is determined to be sufficiently anomalous. The outputs of the machine learning algorithms can be technical in nature and difficult for someone without sufficient mathematical expertise to interpret, therefore, a method of using the weight of evidence of a posterior probability of anomalous behavior to represent the significance of a result is disclosed.

In summary, a method for use in detection of anomalous behavior of a device of a computer system, the method arranged to be performed by a processing system is disclosed, the method comprising: deriving values, $m_1, \ldots, m_N$, of a metric, M, representative of data associated with the device where N denotes the number of available observations of the metric; modelling a distribution of the values; and determining, in accordance with the distribution of the values, the probability of observing a more extreme value of the metric than a given value, m, of the metric, wherein the probability is used to determine whether the device is behaving anomalously.

The probability of observing a more extreme value may be the probability of observing a greater value than the given value, m, when the given value is greater than a suitable quantile point of the values, $m_1, \ldots, m_N$; and/or wherein the probability of observing a more extreme value is the probability of observing a smaller value than the given value, m, when the given value is less than a suitable quantile point of the values, $m_1, \ldots, m_N$.

The method may further comprise determining, in accordance with the probability of observing a more extreme value, and a probabilistic model of the device, a posterior probability of the given value, m, being the result of anomalous behavior of the device, wherein the posterior probability is used to determine whether the device is behaving anomalously.

The method may yet further comprise: determining posterior probabilities for one or more given values, $m_i$, of one or more of a plurality of metrics, $M_i$, wherein the metrics, $M_i$, $i \in \{1, \ldots, n\}$, are representative of data associated with the device; and in accordance with the posterior probabilities for given values, $m_i$, determining an overall posterior probability of the device being in an anomalous state, wherein the overall posterior probability is used to determine whether the device is behaving anomalously.

The probabilistic model may be a Bayesian model.

The metrics, $M_i$, may be assumed to be statistically dependent, the statistical dependencies modelled using copulas.

The method may comprise calculating transformed variables, $z_1, \ldots, z_n$, wherein the transformed variables are such that $z_1, \ldots, z_n = \Phi^{-1}(P(M_1 > m_1)), \ldots, \Phi^{-1}(P(M_n > m_n))$ wherein $\Phi$ denotes a cumulative distribution function of the standard normal distribution and $P(M_i > m_i)$ is the probability of observing a greater value than the given value, $m_i$.

The method may comprise calculating transformed variables, $z_1, \ldots, z_n$, wherein the transformed variables are such that: $z_1, \ldots, z_n = \Phi^{-1}(P(M_1 < m_1)), \ldots, \Phi^{-1}(P(M_n < m_n))$ wherein $\Phi$ denotes a cumulative distribution function of the standard normal distribution and $P(M_i < m_i)$ is the probability of observing a smaller value than the given value, $m_i$.

A logarithm of the Bayes factor, $$\log\left(\frac{P(A)}{1 - P(A)}\right),$$

may be used to describe a measure of anomalousness of the device, where $P(A)$ is the posterior probability or overall posterior probability.

The measure of anomalousness of the device may be determined relative to a reference measure of anomalousness. The measure of anomalousness of the device may be attenuated above a given level. The distribution of the values of the metric may be modelled using extreme value theory. The distribution of the values of the metric may be modelled as a generalized Pareto, Gumbel or Fréchet distribution. The probabilities may be modelled using a peaks over thresholds method. The data associated with the device may comprise network traffic data of the computer system. Anomaly detection may be performed using a subset, $M_1, \ldots, M_{n'}$, of the metrics, $M_1, \ldots, M_n$, where $n' \leq n$.

The subset, $M_1, \ldots, M_{n'}$, of the metrics, $M_1, \ldots, M_n$, where $n' \leq n$, may be chosen by removing values for which $P(M_i > m_i)$ exceeds a threshold probability, where $P(M_i > m_i)$ is the probability of $M_i > m_i$.

The subset, $M_1, \ldots, M_{n'}$, of the metrics, $M_1, \ldots, M_n$, where $n' \leq n$, may be chosen by removing values for which $P(M_i < m_i)$ exceeds a threshold probability, where $P(M_i < m_i)$ is the probability of $M_i < m_i$.

The posterior probability that the given value m of the metric M is the result of anomalous behavior of the device, $P^M(A)$, may be given by:

$$P^M(A) = \frac{\pi(A)}{\pi(N)P(M > m) + \pi(A)}$$

where $\pi(A)$ and $\pi(N)$ denote prior probabilities that the given value, m, of the metric, M, is the result of anomalous or normal behavior of the device, respectively, and $P(M>m)$ is the probability of $M>m$.

The posterior probability that the given value m of the metric M is the result of anomalous behavior of the device, $P^M(A)$, may be given by:

$$P^M(A) = \frac{\pi(A)}{\pi(N)P(M < m) + \pi(A)}$$

where $\pi(A)$ and $\pi(N)$ denote prior probabilities that the given value, m, of the metric, M, is the result of anomalous or normal behavior of the device, respectively, and $P(M<m)$ is the probability of $M<m$.

The combined posterior probability that the device is in an anomalous state, $P^d(A)$, may be given by:

$$P^d(A) = 1 - \prod \frac{\pi(N)P(M_i > m_i)}{\pi(N)P(M_i > m_i) + \pi(A)}$$

where $\pi(A)$ and $\pi(N)$ denote prior probabilities that the given value, $m_i$, of the metric, $M_i$, is the result of anomalous or normal behavior of the device, respectively, and $P(M_i > m_i)$ is the probability of $M_i > m_i$.

The combined posterior probability that the device is in an anomalous state, $P^d(A)$, may be given by:

$$P^d(A) = 1 - \prod \frac{\pi(N)P(M_i < m_i)}{\pi(N)P(M_i < m_i) + \pi(A)}$$

where $\pi(A)$ and $\pi(N)$ denote prior probabilities that the given value, $m_i$, of the metric, $M_i$, is the result of anomalous or normal behavior of the device, respectively, and $P(M_i < m_i)$ is the probability of $M_i < m_i$.

The combined posterior probability that the device is in an anomalous state, $P^d(A)$, may be given by:
where $P_{\sigma(i)}$ denotes $$P^d(A) = 1 - \prod_{i=1}^{n} \frac{\pi(N)P_{\sigma(i)}}{\pi(N)P_{\sigma(i)} + \pi(A)}$$

$$P(Z_{\sigma(i)} \leq z_{\sigma(i)} | Z_{\sigma(1)} = z_{\sigma(1)}, \ldots, Z_{\sigma(i-1)} = z_{\sigma(i-1)}),$$

Z denotes the transformed variables, $z_1, \ldots, z_n$, $\sigma$ denotes a permutation of the indexes i, $\{1, \ldots, n\}$, and $\pi(A)$ and $\pi(N)$ denote prior probabilities that the given value, $m_i$, of the metric, $M_i$, is the result of anomalous or normal behavior of the device.

The permutation of indexes i, $\{1, \ldots, n\}$, may maximize the value of $P^d(A)$. The suitable quantile point may be the median.

In another arrangement, a method for use in detection of anomalous behavior of a device of a computer system is provided. The method is arranged to be performed by a processing system, may comprise: deriving values, $m_1, \ldots, m_N$, of a metric, M, representative of data associated with the device; optionally modelling a distribution of the values; and further optionally determining, in accordance with the distribution of the values, the probability of a given value, m, being exceeded, $P(M>m)$, wherein the probability is used to determine whether the device is behaving anomalously.

Alternatively, a method for use in detection of anomalous behavior of a device of a computer system, the method arranged to be performed by a processing system, may comprise: deriving values, $m_1, \ldots, m_N$, of a metric, M, representative of data associated with the device; optionally modelling a distribution of the values; and optionally determining, in accordance with the distribution of the values, the probability of observing a more extreme value than a given value, m, wherein the probability is used to determine whether the device is behaving anomalously; further optionally, wherein the probability of observing a more extreme value is the probability of observing a greater value than the given value, m, when the given value is greater than a suitable quantile point of the values, $m_1, \ldots, m_N$; and/or wherein the probability of observing a more extreme value is the probability of observing a smaller value than the given value, m, when the given value is less than a suitable quantile point of the values, $m_1, \ldots, m_N$. A suitable quantile point may be the median.

When the probability of observing a more extreme value than a given value, m, is the probability of observing a greater value than the given value when the given value is greater than a suitable quantile point of the values, $m_1, \ldots, m_N$, the suitable quantile point may be the median, the 75% quantile or the 90% quantile.

According to another aspect of the claimed invention, there is provided a computer readable medium comprising computer readable code operable, in use, to instruct a computer to perform any method disclosed herein.

According to another aspect of the claimed invention, there is provided an anomalous behavior detection system comprising a processor, and a memory comprising computer readable code operable, in use, to instruct the processor to perform any method disclosed herein.

When the probability of observing a more extreme value than a given value, m, is the probability of observing a smaller value than the given value when the given value is smaller than a suitable quantile point of the values, $m_1, \ldots, m_N$, the suitable quantile point may be the median, the 25% quantile or the 10% quantile.

Values may be considered to be extreme if they are unusually small or unusually large. Values may be considered to be unusually small if, for example, they fall far below a suitable quantile point. Values may be considered to be unusually large if they fall far above a suitable quantile point. An observation or given value m of some metric M may be considered to be extreme if either of the tail probabilities $P(M>m), P(M<m)$ are sufficiently small. Depending on the size of the network, sufficiently small may be if either of the tail probabilities are below some value in the range of $10^{-2}$ to $10^{-7}$.

BRIEF DESCRIPTION OF THE DRAWINGS

Arrangements will now be described with reference to the drawings in which.

Throughout the description and the drawings, like reference numerals refer to like parts.

SPECIFIC DESCRIPTION

An anomalous behavior detection system will now be disclosed. First, a method of modelling the distribution of values of metrics, using extreme value theory, is disclosed. The metrics are representative of data associated with a device of a computer system, such as a network of computers. The distribution is then used to calculate the survival probabilities of observations of values of the metric. The survival probability is the probability of observing a more extreme value than the observed value, for example, the probability of a large value being exceeded or vice versa. A probabilistic model of the device of the computer system is then described. Subsequently, a method of calculating the probability that the device is behaving abnormally is disclosed, wherein the probability is calculated in accordance with observed given values and the probabilistic model. Furthermore, a method of using copulas to describe the dependencies between metrics is described.

Figure 1:
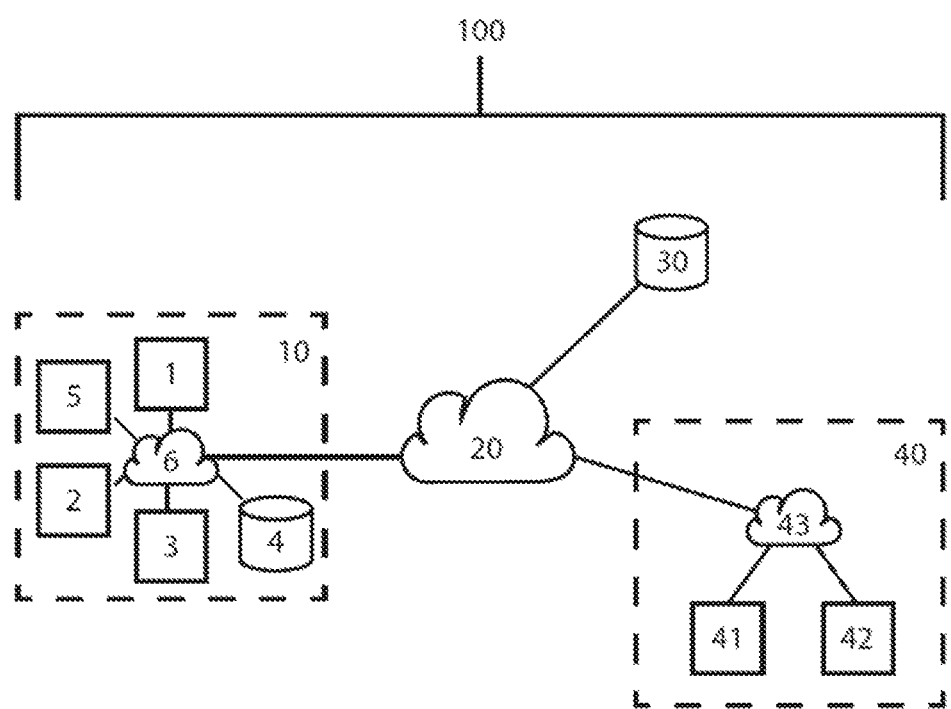
FIG. 1 illustrates a network of computer systems 100 using an anomalous behavior detection system.

FIG. 1 illustrates a network of computer systems 100 using an anomalous behavior detection system. The system depicted by FIG. 1 is a simplified illustration which is provided for ease of explanation.

The network 100 comprises a first computer system 10 within a building, which uses the anomalous behavior detection system to detect anomalous behavior and thereby attempt to prevent threats to computing devices within its bounds. The first computer system 10 comprises three computers 1, 2, 3, a local server 4, and a multifunctional device (MFD) 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this arrangement, computer 1 on the first computer system 10 has the anomalous behavior detection system and therefore runs the anomalous behavior detection method for detecting anomalous behavior of the first computer system. As such, it comprises a processor arranged to run the steps of the process described herein, memory required to store information related to the running of the process, as well as a network interface for collecting the required information. This method shall now be described in detail with reference to FIG. 1.

The computer 1 builds and maintains a dynamic, ever-changing model of the 'normal behavior' of each device within the system 10, based on the distribution of metrics. The approach is based on a Bayesian probabilistic model, described in more detail below, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 a.m. and midday, and is active from about 8.30 a.m. until 6 p.m. The same employee virtually never accesses the employee time sheets, very rarely connects to the company's Atlanta network and has no dealings in South-East Asia. The anomalous behavior detection system takes all the information that is available relating to this employee and establishes a 'pattern of life' for that person, which is dynamically updated as more information is gathered. The 'normal' model is used as a moving benchmark, allowing the system to spot behavior of a device that seems to fall outside of this normal pattern, and flags this behavior as anomalous, requiring further investigation.

Figure 2:
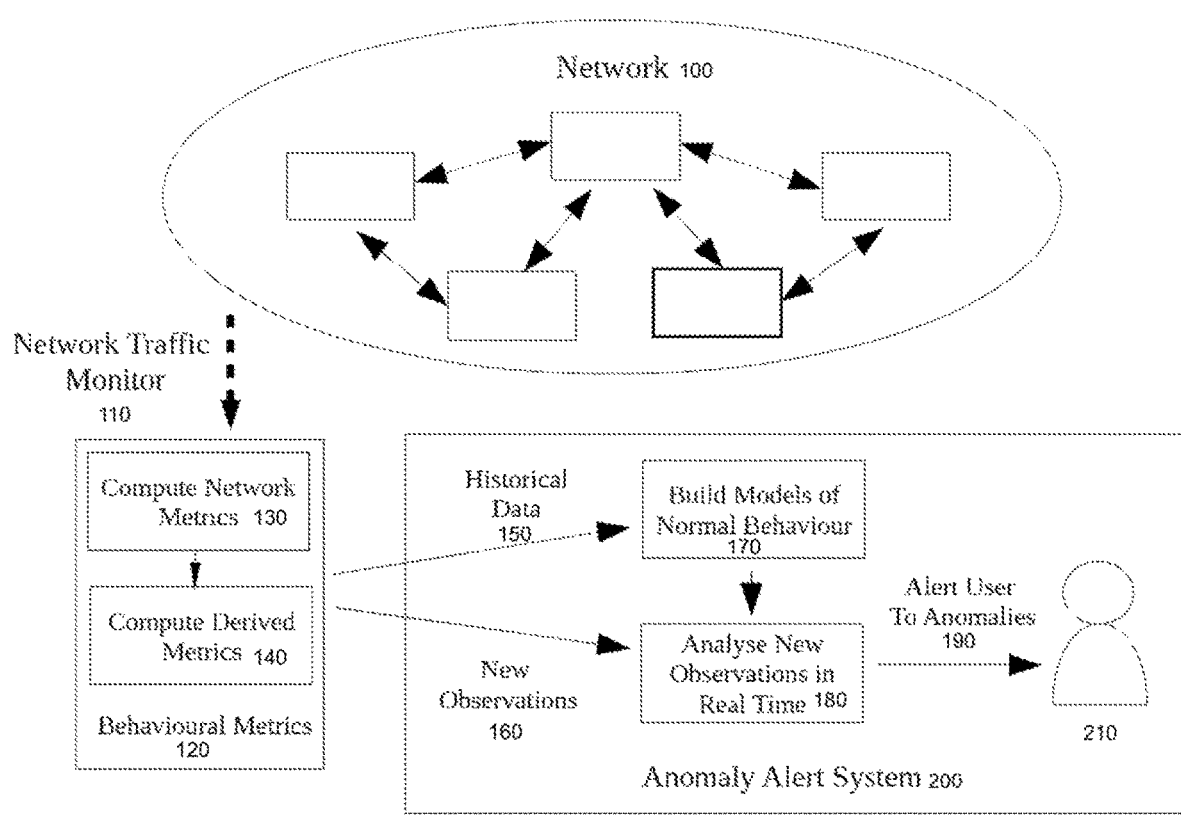
FIG. 2 illustrates an example of a high level structure of an anomalous behavior detection system.

The high level structure of the anomaly alert system is illustrated in FIG. 2. A network traffic monitor 110 extracts meta-data of packets moving across a network 100.

In the next stage the measurements of network activity are processed to produce behavior metrics 120. Two different types of metric may be computed: network metrics 130 and derived metrics 140. These are fed to the anomaly alert system 200.

In the next stage, historical data 150 of each individual behavior metric may be analyzed. A mathematical model of what is considered to be normal behavior 170 for that metric is constructed for each device on the network from historical data. The third stage of the system comprises receiving new observations 160 and analyzing the new observations of the activity of each network device in real time 180 to detect anomalous behavior. This is done by first processing the new network activity measurement of each device to compute the values of the corresponding behavioral metrics. These values are then analyzed to see how anomalous the value of each metric is. Finally the levels of anomalousness of the values of each behavioral metric of a device are combined to produce a measure of the overall anomalousness of the behavior of each device. Network system administrators/security officers 210 may be sent alerts 190 about any device whose behavior is determined to be sufficiently anomalous.

The anomaly alert system consists of at least two innovations:
  a method for detecting anomalies in datasets.
  an approach to visualizing probabilities that allows a user to easily rank the importance of different alerts and control the rate of false alerts.

To begin, an explanation of the behavioral metrics 120, which form the input of the anomaly alert system 200, will be given.

Computation of the Behavioral Metrics

The behavioral metrics are computed from data sampled by the network traffic monitoring system. As described above there are two types of metric, network metrics and derived metrics. The network metrics may include:
  Total volume of data flowing from a device in a given time interval.
  Total volume of data flowing to a device in a given time interval.
  Number of connections from a device to other devices on the network in a given time interval.
  Number of connections to a device from other devices on the network in a given time interval.
  Number of connections from a device to other devices outside the network in a given time interval.
  Number of connections to a device from other devices outside the network in a given time interval.
  Number of DNS requests made by a device in a given time interval.
  Number of multicasts made by a device in a given time interval.
  Number of broadcasts made by a device in a given time interval.
  Number of attempts made by a device to connect to closed ports on other devices in a given time interval.
  Number of server message block (SMB) read requests made by a device in a given time interval.
  Number of SMB write requests made by a device in a given time interval.
  Number of failed SMB requests made by a device in a given time interval.
  Number of attempts at authentication (e.g. Kerberos) made from a device in a given time interval.
  Number of failed attempts at authentication (e.g. Kerberos) made from a device in a given time interval.
  Square root transforms of any of the above metrics.
  Logarithmic transforms of the form $\log(\alpha+.)$ for any $\alpha>0$ of any of the above metrics.

The derived metrics are the results of anomaly detection algorithms applied to subsets of the network metrics. Anomaly detection algorithms may include:
  One class SVM.
  Local outlier factor.
  Probabilistic outlier modelling. In this method a mixture model or kernel density estimate is used to model the density of the observations. The density of new observations is then computed using this model and used to give an estimate of how anomalous the new observation is. In practice the reciprocal of the density may be used as this gives a score that increases with more anomalous (i.e. lower density) observations.
  Markov transition models.

The network and derived metrics form the inputs of the threat alert system that is detailed in the remaining sections.

A Bayesian Framework for Anomaly Detection

A systematic framework for detecting anomalous behavior in network devices will now be disclosed.

The problem of detecting anomalous behavior of network devices given the values of a collection of real valued metrics $M_1, \ldots, M_n$ for each device is considered. The framework for anomaly detection is based on the idea that users of anomaly detection systems may be looking to be alerted to values of metrics that are extreme in some way. If the data is real valued then extreme must mean either unusually large or unusually small. Values may be considered to be unusually small if, for example, they fall far below a suitable quantile point. Values may be considered to be unusually large if they fall far above a suitable quantile point. It follows that an observation or given value m of some metric M is anomalous if either of the tail probabilities $$P(M>m), P(M<m)$$

are sufficiently small. Depending on the size of the network, sufficiently small may mean if the tail probabilities are below some value in the range of $10^{-2}$ to $10^{-2}$. To simplify the mathematics the anomaly detection system will only consider tail probabilities of the form $$P(M>m). \quad (1)$$

Tail probabilities of the form $$P(M<m)$$

may also be considered or alternatively can be incorporated by looking instead at the tail probability $$P(-M>-m).$$

It may be preferable to consider tail probabilities of the form P(M>m) when an observation m is greater than a suitable quantile point of the value of the metric M, and consider tail probabilities of the form P(M<m) when an observation m is less than a suitable quantile point the value of the metric M.

Before one can apply the above insight in a systematic manner one must overcome the following technical difficulty. To be able to compute the tail probabilities (1) an estimate of the distribution of the metric M which will typically be derived from historical observations of its values is needed. However when computing (1) in the context of anomaly detection the most significant parts of the distribution of M may be those far in the tails, typically well outside the range of any historical data points. Thus to be able to use (1) effectively a method for extrapolating the tails of a distribution beyond the range of the available set of observations is needed. To achieve this, extreme value theory is used. In particular, the method of Peaks Over Thresholds (POT) is used for estimating tail probabilities and quantiles from observed data.

Below, a brief overview of extreme value theory is given. Later a method for using the POT method to compute tail probabilities of the form (1) is detailed. Then a method for computing the probability that an observation m of a single metric M was generated by anomalous behavior given the tail probabilities (1) is detailed. Then a method for computing the probability that a device is in an anomalous state given the values of a collection of behavioral metrics $M_1, \ldots, M_n$ is disclosed. Finally, the ideas of these preceding sections are tied together and a framework for detecting anomalous behaviors in real valued data is detailed.

A Brief Introduction to the Theory of Extreme Values

The theory of extreme values may be used for modelling the probabilities of events that lie far into the tails of a distribution, typically beyond the range of any empirical data. Extreme value theory shows that under suitable conditions the probabilities of extreme events can be related to members of the family of generalized extreme value distributions defined by the cumulative distribution functions $$F_\xi(x) = \begin{cases} \exp(-(1+\xi x)^{-1/\xi}) & \text{if } \xi \neq 0 \\ \exp(-\exp(-x)) & \text{if } \xi = 0 \end{cases}$$

where $1\xi x > 0$ and $\xi$ is a modelling parameter that must be selected in a data dependent fashion. In particular it can be shown that for any probability P that lies in the maximal domain of attraction of a member of the family of generalized extreme value distributions the exceedance probabilities of P can be described in the following manner.

Let X be a random variable with distribution P and let $P_u = P(X-u|X \geq u)$ denote the conditional distribution of X−u given that the value of X exceeds an arbitrary threshold, u. If P belongs to the maximal domain of attraction of a member of the family of generalized extreme value distributions then it can be shown that $$\lim_{u \to \infty} P_u$$

belongs to the family of generalized Pareto distributions (GPDs) with cumulative distribution functions $$F_{\xi,\sigma}(x) = \begin{cases} 1-(1+\xi x/\sigma)^{-1/\xi} & \text{if } \xi \neq 0 \\ 1-\exp(-x/\sigma) & \text{if } \xi = 0 \end{cases}$$

where $x \geq 0$ if $\xi \geq 0$, $0 \leq x \leq -\sigma/\xi$ if $\xi < 0$

This result motivates the POT method to modelling the tails of a distribution. Given a random variable X with distribution P and a sequence of observations $x_1, \ldots, x_K$ ordered so that $x_1 < \ldots < x_K$ the tail of the distribution can be modelled in the following manner.

1. Choose a suitable $1 \leq k \leq K$.
2. Estimate the probability $P(X > x_k)$ by $$\frac{K-k}{K}.$$

3. Model the conditional probability $P(X-x_k|X>x_k)$ by fitting a GPD to the observations $x_{k+1}, \ldots, x_K$.
4. For any x, estimate $P(X>x)$ by using the empirical distribution if $x \leq x_k$ and using the estimates of $P(X>x_k)$ and $P(X-x_k|X>x_k)$ computed in steps 2 and 3 above if $x > x_k$.

The key to POT modelling is the choice of k. A method for using the POT method to compute tail probabilities of observations will now be presented.

An Algorithm for Computing Tail Probabilities of Metrics

A method for using the POT method to compute tail probabilities of the form (1) for some real valued metric M will now be presented. In order to make the ideas in this section rigorous the following assumption is made.

Assumption 1

The distribution of the metric M belongs to the maximal domain of attraction of an extreme value distribution.

Under the conditions of this assumption one can compute the tail probabilities for a metric M in the following manner.

Algorithm 1

Assume that Assumption 1 holds.

Model Fitting

1. Given a set of observations $m_1, \ldots, m_N$ of the metric M use a suitable POT fitting method to find
   a threshold u.
   an estimate $\hat{P}(M>u)$ of the tail probability (1).
   an estimate $\hat{\xi}, \hat{\sigma}$ of the parameters of the GPD that describes the conditional distribution $P(M-u|M>u)$.

Anomaly Detection

1. Given an observation m
   compute the tail probability P(M>m) using the empirical distribution of $m_1, \ldots, m_N$ if $m \leq u$ and $$\hat{P}(M>u)F_{\hat{\xi},\hat{\sigma}}(m-u)$$

otherwise.
   return $$P(M>m)$$

as a measure of the anomalousness of the value of m.

The observation m may or may not have been used to model the distribution of $m_1, \ldots, m_N$. That is to say, m may or may not belong to $m_1, \ldots, m_N$. It may be preferable to model the tail probabilities (1) using a restricted set of the set of GPDs. In many cases one may want to assume that the probabilities P(M>u) belong to either the Gumbel or Fréchet family of distributions (equivalent to assuming that $\xi \geq 0$). Moreover when computing the distribution of the tail probabilities (1) it may be desirable to avoid having the estimates of the tail parameters skewed by any outliers in the observations. This may be done by either discarding a certain fraction of the largest observations or by employing some kind of M-estimator.

A Bayesian Algorithm for Computing Anomaly Probabilities from Tail Probabilities A method for computing the probability that an observation m of a metric M was generated by anomalous behavior given the tail values (1) will now be presented.

This method is based on the following probabilistic model. Given an observation m of a metric M the behavior that generated it can be either anomalous or normal. Let $\pi(N)$ and $\pi(A)$ denote the prior probabilities that the value m is the result of normal or anomalous behavior respectively. Later, a method for selecting the values of the priors in the context of network anomaly detection is described. For the moment it will be assumed that they have been given sui generis.

Given the priors $\pi(N)$ and $\pi(A)$ one can then derive the posterior probability, i.e. the conditional probability that is assigned after the relevant evidence or background is taken into account, of the behavior that generated the value of M being normal or anomalous respectively using Bayes theorem as follows. Given an event E the posterior probabilities of the generating behavior being normal or anomalous are $$P^M(N) = \frac{\pi(N)P(E \mid N)}{\pi(N)P(E \mid N) + \pi(A)P(E \mid A)} \quad (2)$$

$$P^M(A) = \frac{\pi(A)P(E \mid A)}{\pi(N)P(E \mid N) + \pi(A)P(E \mid A)}.$$

where P(E|N) and P(E|A) denote the probabilities of the event E given that the generating behavior is normal or anomalous respectively. In light of the discussion above a natural choice of event E may be the set of all possible behaviors such that the value of M is greater than the observed value m.

From this it immediately follows that $$P(E|N)=P(M>m). \quad (3)$$

Note that this formulation gives meaning to the statement that the tail probabilities (1) measure the significance of a value of a metric M. To derive a value for P(E|A), the following argument is made.

The probability P(M>m|A) for some $m \in \mathbb{R}$ can be thought of as the probability that M>m given the class of all possible models of anomalous behavior. Formally, this could be expressed by saying that $$P(M > m \mid A) = \frac{\int_\Omega p(x > m)\mu(dp)}{\int_\Omega \mu(dp)} \quad (4)$$

where $\Omega$ is the space of probability measures on $\mathbb{R}$ and $\mu$ is a positive measure defined on $\Omega$. If $\mu$ was a finite measure on $\Omega$ then it would follow that $$lim_{m \to \infty} P(M>m|A)=0$$

which would imply that the anomaly model would fail to explain the full set of possible anomalies. Since this is clearly unsatisfactory it must follow that the measure $\mu$ is not finite but $\sigma$-finite. If $\mu$ is $\sigma$-finite then ensuring that (4) remains well defined requires delicate care. Essentially what one has to do is define P(M>m|A) as a limit of the form $$\lim_{i \to \infty} \frac{\int_{\Omega_i} p(x > m)\mu(dp)}{\int_{\Omega_i} \mu(dp)} \quad (5)$$

where $\Omega_1, \ldots$ is a monotonically increasing sequence of subsets of $\Omega$ such that $\mu(\Omega_i)<\infty$ for all i and $\lim_{i \to \infty}\Omega_i = \Omega$. However the limit in (5) is only well defined if it does not depend on the choice of the sequence $\Omega_1, \ldots$. This is only possible if for any real number m there exists a real number $y_m \in [0,1]$ such that for all $\varepsilon>0$ $$\mu(p \in \Omega | p(x>m) \notin [y_m-\varepsilon, y_m+\varepsilon]) < \infty.$$

It follows from this that (5) may define an improper probability distribution, i.e. a probability distribution whose cumulative distribution function F has the property that $$\lim_{x \to -\infty} F(x) > 0 \text{ and/or } \lim_{x \to \infty} F(x) < 1.$$

This allows a mathematical form to be given to the intuition that the anomaly model should be agnostic as to which type of anomaly is more likely. Formally, this requirement can be expressed as $$P(M>m|A)=P(M>n|A)$$

for all m, $n \in \mathbb{R}$ from which it follows that $$P(M>m|A)=c \quad (6)$$

for all $m \in \mathbb{R}$ for some constant $c \in (0,1]$. However note that that when the results in (2), (3) and (6) are combined, the constant c can be absorbed into the priors $\pi(N)$ and $\pi(A)$ and hence it can always be assumed that P(E|A)=1. This gives the following algorithm for computing the posterior probability of the value of a behavioral metric being anomalous Algorithm 2

Let $\pi(N)$ and $\pi(A)$ denote the prior probabilities that the behavior generating an observed value of the metric M is normal or anomalous respectively. Then the posterior probabilities that the underlying behavior generating an observation m is normal or anomalous are given by $$P^M(N) = \frac{\pi(N)P(M > m)}{\pi(N)P(M > m) + \pi(A)}$$

$$P^M(A) = \frac{\pi(A)}{\pi(N)P(M > m) + \pi(A)}.$$

The tail probabilities P(M>m) can be computed using Algorithm 1.

A Bayesian Framework for Computing Anomaly Probabilities for Network Devices

In this section the problem of computing the probability that a network device is behaving anomalously given the values of a collection of real valued behavioral metrics $M_1, \ldots, M_n$ is considered. First, one option for what it means for a device to be behaving anomalously is defined.

Definition 1

A network device d is behaving anomalously if and only if one or more of the observed values of the metrics $M_1, \ldots, M_n$ (more specifically one or more of the underlying behaviors generating the values of these metrics) are anomalous.

Note that this definition explicitly acknowledges the GIGO (garbage-in-garbage-out) principle, that is to say, no matter how good the post-processing, an anomaly detection system is ultimately no better than the features that it analyses.

To simplify the exposition, first the method in the special case where the metrics are statistically independent will be described.

Computing Anomaly Probabilities of Network Devices using Independent Metrics

The following assumption is made.

Assumption 2

The metrics $M_1, \ldots, M_n$ are statistically independent.

Under the conditions of Assumption 2, Definition 1 leads to an algorithm for computing the probability that a device is in an anomalous state. For a device d let $P^d(N)$ and $P^d(A)$ denote the probabilities that it is in a normal or anomalous state respectively. Furthermore for each i let $P_i^M(N)$ and $P_i^M(A)$ denote the probabilities that the behavior generating the value of metric M is normal or anomalous respectively. Then from Definition 1 and Assumption 2 it follows that $$P^d(N)=\Pi P_i^M(N),$$

$$P^d(A)=1-\Pi P_i^M(N)$$

The anomaly probabilities $P_i^M(A)$ can all be computed using Algorithm 2. This leads to the following algorithm for fusing the outputs of multiple independent anomaly detection algorithms:

Algorithm 3

Assume Assumption 2 holds. For each i let $\pi(N)$ and $\pi(A)$ denote the prior probabilities that the behavior generating the value of a behavioral metric $M_i$ is normal or anomalous respectively. Moreover let $P^d(N)$ and $P^d(A)$ denote the probabilities that device d is in a normal or anomalous state respectively. Then given observations $m_1, \ldots, m_n$ the probabilities $P^d(N)$ and $P^d(A)$ can be computed using the formula $$P^d(N) = \prod \frac{\pi(N)P(M_i > m_i)}{\pi(N)P(M_i > m_i) + \pi(A)}, \quad (7)$$

$$P^d(A) = 1 - \prod \frac{\pi(N)P(M_i > m_i)}{\pi(N)P(M_i > m_i) + \pi(A)}$$

with the quantities $$P(M_i>m_i)$$

estimated using the method detailed in Algorithm 1.

Computing Anomaly Probabilities of Network Devices using Possibly Dependent Metrics Earlier a method for computing the probability that a network device is behaving anomalously given the values of a collection of statistically independent metrics was described. An algorithm that allows the same objective to be achieved when the assumption of statistical independence is dropped will now be described.

It is first observed that the quantities $P(M_i>m_i)$ are themselves uniform random variables. Using $U_i$ to denote the random variable $P(M_i>m_i)$ and noting that $$P(U_i \leq P(M_i>m_i))=P(M_i>m_i)$$

it seems natural to replace the quantities $P(M_i>m_i)$ in (7) with the quantities $$P(U_i \leq P(M_i>m_i)|U_1=P(M_1>m_1), \ldots, U_{i-1}=P(M_{i-1}>m_{i-1})) \quad (8)$$

to account for the dependencies between them. However to ensure that any significant anomalies are not 'explained away' by conditioning on other less significant exceedance probabilities, a permutation $\sigma$ of $\{1, \ldots, n\}$ such that the reordering of the metrics given by $M'_i=M_{\sigma(i)}$ maximizes the value of $P^d(A)$ in (7) should first be found. This is computationally expensive. An alternative method of doing this is using a greedy procedure whereby the permutation $\sigma$ is chosen so that it has the property that $$P(U'_i \leq P(M'_i>m'_i)|U'_1=P(M'_1>m'_1), \ldots, U'_{i-1}=P(M'_{i-1}>m'_{i-1})) \leq P(U'_k \leq P(M'_k>m'_k)|U'_1=P(M'_1>m'_1), \ldots, U'_{i-1}=P(M'_{i-1}>m'_{i-1})) \quad (9)$$

for all $k \in \{i+1, \ldots, n\}$. In practice one may want to compute (7) using only a subset of the random variables $U_i$ that are below some threshold probability. This may reduce processing time or memory requirements.

In order to put this into practice it is first necessary to be able to efficiently compute the conditional probabilities (8). This requires a suitable model of the dependencies between the different metrics. A key aspect of this method is to use the concept of copulas to model these dependencies. This may allow for efficient modelling of these dependencies and so reduce processing time or memory requirements. A brief review of copulas will now be presented.

Modelling Dependencies Using Copulas

A copula C is a joint cumulative distribution function)

$$C(u_1, \ldots, u_n)=P(U_1 \leq u_1, \ldots, U_n \leq u_n)$$

of a collection of random variables $U_1, \ldots, U_n$ with uniform marginal distributions. The theoretical foundation of the use of copulas is Sklar's theorem which states that every multivariate cumulative distribution function $$F(z_1, \ldots, z_n)=P(Z_1 \leq z_1, \ldots, Z_d \leq z_n)$$

of a collection of random variables $Z_1, \ldots, Z_n$ can be expressed in terms of the marginals $F_i(z_i)=P(Z_i \leq z_i)$ as $$F(z_1, \ldots, z_n)=C(F_1(z_1), \ldots, F_n(z_n))$$

where C is a suitable copula.

The power of the copula method is that there are a wide range of parametric families of copulas which together provide users of copulas with a way of modelling a broad range of different statistical dependencies. A suitable choice of copula for modelling the dependencies between the exceedance probabilities of different behavioral metrics will now be given.

A Suitable Choice of Copula

Ideally, a copula should be both effective at capturing dependencies and allow for efficient computation of the conditional probabilities (8). One copula that fits both these criteria is the Gaussian copula $$C_R^{Gauss}(u_1, \ldots, u_n)=\Phi_R(\Phi^{-1}(u_1), \ldots, \Phi^{-1}(u_n)) \quad (10)$$

where $\Phi$ is the cumulative distribution function of the standard univariate normal with mean zero and variance one and $\Phi_R$ is the cumulative distribution function of the multivariate normal distribution with standard normal marginals and correlation matrix R.

When fitting the parameters of this model it may be desirable to be careful to avoid introducing spurious correlations in the correlation matrix R. To achieve this model sparsity a lasso penalty may be imposed on the off diagonal coefficients of R. In practice it may be necessary to allow for random errors in the computation of the metrics $M_i$ due to computational issues such as the network traffic monitor dropping packets. As a result when fitting R a suitably regularized version of the empirical correlation matrix may be used.

To find the coefficients of R under the lasso penalty the ISTA algorithm with backtracking which is outlined below in Algorithm 4 is used.

Algorithm 4 (Backtracking ISTA)

Given two positive definite matrices A and B, a penalty $\lambda$ and a penalty matrix P define $$F(M) = tr(A^{-1}M) + tr(M^{-1}B) + \lambda \|P*M\|_1$$

where * denotes element wise multiplication and $$Q_L(M_1, M_2) = tr(A^{-1}M_2) + tr(M_2^{-1}B) +$$
$$(M_1 - M_2)^T(A - M_2^{-1}BM_2^{-1}) + \frac{L}{2}\|M_1 - M_2\|^2 + \lambda\|P*M_1\|_1.$$

Let S denote the soft thresholding operator defined by $$S(U,V)_{i,j} = sgn(U_{i,j})(|U_{i,j}| - V_{i,j})_+$$

for any two matrices U, V. Then the solution to the minimization problem $$\underset{M}{\operatorname{argmin}} F(M)$$

can be solved in the following manner
1. Initialize the estimate of M with $M_0 = A$.
2. Repeat until convergence
   Find the smallest nonnegative integer k such that $$F\left(S\left(M_i - \frac{1}{2^k}(A - M_i^{-1}BM_i^{-1}), \frac{\log N}{2^k N}P\right)\right) \leq$$
$$Q_{\frac{1}{2^k}}\left(S\left(M_i - \frac{1}{2^k}(A - M_i^{-1}BM_i^{-1}), \frac{\log N}{2^k N}P\right), M_i\right)$$

Set $M_{i+1}$ equal to $$S\left(M_i - \frac{1}{2^k}(A - M_i^{-1}BM_i^{-1}), \frac{\log N}{2^k N}P\right)$$

This leads to the following procedure for fitting the parameters of the copula (10). First, given a sequence $(u_{1,1}, \ldots, u_{1,n}), \ldots, (u_{N,1}, \ldots, u_{N,n})$ of observations of the uniform random variables whose dependency structure is to be modelled, compute the sequence of transformed variables $$(z_{1,1}, \ldots, z_{1,n}) = (\Phi^{-1}(u_{1,1}), \ldots, \Phi^{-1}(u_{1,n}))$$
$$\vdots$$
$$(z_{N,1}, \ldots, z_{N,n}) = (\Phi^{-1}(u_{N,1}), \ldots, \Phi^{-1}(u_{N,n})).$$

Then use backtracking ISTA (Algorithm 4), applied to a regularized version of the empirical correlation matrix to obtain a sparse estimate of the correlation matrix R.

Putting all these steps together leads to the following parameter fitting algorithm.

Algorithm 5
Model Fitting

Given a regularization parameter $0 < \delta < 1$, a lasso penalty $\lambda > 0$ and a sequence $(u_{1,1}, \ldots, u_{1,n}), \ldots, (u_{N,1}, \ldots, u_{N,n})$ of historical observations of the uniform random variables whose dependency structure is to be modelled
1. Compute the sequence of transformed variables $$(z_{1,1}, \ldots, z_{1,n}) = (\Phi^{-1}(u_{1,1}), \ldots, \Phi^{-1}(u_{1,n}))$$
$$\vdots$$
$$(z_{N,1}, \ldots, z_{N,n}) = (\Phi^{-1}(u_{N,1}), \ldots, \Phi^{-1}(u_{N,n}))$$

where $\Phi$ denotes the cumulative distribution function of the standard normal distribution and let Z denote the matrix of transformed observations $$\begin{pmatrix} z_{1,1} & \cdots & z_{1,n} \\ \vdots & & \vdots \\ z_{N,1} & \cdots & z_{N,n} \end{pmatrix}$$

2. Compute the empirical correlation matrix $$\Sigma = \frac{Z^T Z}{N}$$

and the regularized empirical correlation matrix $\Sigma^\delta = (1-\delta)\Sigma + \delta I$ where I denotes the n×n identity matrix.
3. Initialize the estimate of R by $$R_0 = \Sigma^\delta$$

Until convergence repeat $$R_{i+1} = \underset{M}{\operatorname{argmin}}\left\{ tr(R_i^{-1}M) + tr\left(M^{-1}\sum{}^\delta\right) + \lambda\|P*M\|_1 \right\}$$

where P is the penalty matrix with zeros on the diagonal and ones everywhere else and where the solution to the minimization problem is computed using Backtracking ISTA (Algorithm 4).

Remark 1

Least squares models are known to be sensitive to outliers. The above procedure can be made robust by replacing the observations $u_{\cdot,i}$ with their ranks and then setting the transformed variables $z_{\cdot,i}$ to be the corresponding quantile points.

In the anomaly detection phase, given a set of observations $u_1, \ldots, u_n$ of the random variables $U_1, \ldots, U_n$ those observations that exceed some threshold $p_{thresh}$ are discarded to obtain a restricted set of observations $\tilde{u}_1, \ldots, \tilde{u}_{n'}$ with $n' \leq n$. This may reduce processing time or memory requirements. Later it is discussed how $p_{thresh}$ can be chosen in a data driven way.

Given this restricted set of observations, (7) can then be computed by estimating the conditional probabilities (8) applied to the restricted set of observations $\tilde{U}_1, \ldots, \tilde{U}_{n'}$ with $$P(\tilde{U}_i \leq \tilde{u}_i | \tilde{U}_1 = \tilde{u}_1, \ldots, \tilde{U}_{i-1} = \tilde{u}_{i-1}) = P(Z_i \leq z_i | Z_1 = z_1, \ldots, Z_{i-1} = z_{i-1}) \quad (11)$$

where the $Z_i$ denote the transformed variables $$Z_1, \ldots, Z_n = \Phi^{-1}(\tilde{U}_1), \ldots, \Phi^{-1}(\tilde{U}_n)$$

and then computing (7) using (8) with the ordering specified by (9). This leads to the following anomaly detection algorithm.

Algorithm 6

Let R denote the estimate of the correlation matrix of the Gaussian copula (10) obtained by using Algorithm 5, let the exceedance probability threshold $p_{thresh}$ be given and let $\pi(N)$ and $\pi(A)$ denote the prior probabilities that the behavior generating the value of a metric $M_i$ is normal or anomalous respectively.

Anomaly Detection

Given observations $u_1, \ldots, u_n$

1. Discard all observations that exceed the threshold $p_{thresh}$ to get a new restricted set of observations $\tilde{u}_1, \ldots, \tilde{u}_{n'}$, $n' \leq n$.
2. Compute the restricted set of transformed variables $$z_1, \ldots, z_{n'} = \Phi^{-1}(\tilde{u}_1), \ldots, \Phi^{-1}(\tilde{u}_{n'}).$$

3. Compute R', the correlation matrix of the restricted set of transformed variables $z_1, \ldots, z_{n'}$.
4. Find the permutation $\sigma$ of $\{1, \ldots, n'\}$ which has the property that for all $i \in \{1, \ldots, n'\}$ $$P(Z_{\sigma(i)} \leq z_{\sigma(i)} | Z_{\sigma(1)} = z_{\sigma(1)}, \ldots, Z_{\sigma(i-1)} = z_{\sigma(i-1)}) \leq P(Z_{\sigma(j)} \leq z_{\sigma(j)} | Z_{\sigma(1)} = z_{\sigma(1)}, \ldots, Z_{\sigma(i-1)} = z_{\sigma(i-1)}) \quad (12)$$

for all $j \in \{i+1, \ldots, n'\}$

5. Estimate the posterior probabilities $P^d(N)$ and $P^d(A)$ by $$P^d(N) = \prod_{i=1}^{n'} \frac{\pi(N) P_{\sigma(i)}}{\pi(N) P_{\sigma(i)} + \pi(A)}$$

$$P^d(A) = 1 - \prod_{i=1}^{n'} \frac{\pi(N) P_{\sigma(i)}}{\pi(N) P_{\sigma(i)} + \pi(A)}$$

where $P_{\sigma(i)}$ denotes $$P(Z_{\sigma(i)} \leq z_{\sigma(i)} | Z_{\sigma(1)} = z_{\sigma(1)}, \ldots, Z_{\sigma(i-1)} = z_{\sigma(i-1)}).$$

Detecting Anomalous Behavior in Network Devices using Statistically Dependent Metrics By combining the preceding ideas the following general method for computing the probability that a device is in an anomalous state given measurements of a collection of behavioral metrics can be obtained.

Algorithm 7

Assume that one has a set of behavioral metrics $M_1, \ldots, M_n$ and let $\pi(N)$ and $\pi(A)$ denote the prior probabilities that the behavior generating the value of a metric $M_i$ is normal or anomalous respectively, $p_{thresh}$ denote the exceedance probability threshold, $0 < \delta < 1$ denote the regularization parameter and $\lambda > 0$ the lasso penalty.

Model Fitting

Given an historical sequence of observations of the values of the metrics $M_1, \ldots, M_n$ 1. Compute the sequence of exceedance probabilities $$(P(M_1 > m_1), \ldots, P(M_n > m_n))_1$$
$$\vdots$$
$$(P(M_1 > m_1), \ldots, P(M_n > m_n))_N$$

2. Compute the sequence of transformed variables $$(z_{1,1}, \ldots, z_{1,n}) = (\Phi^{-1}(P(M_1 > m_1)), \ldots, \Phi^{-1}(P(M_n > m_n)))_1$$
$$\vdots$$
$$(z_{N,1}, \ldots, z_{N,n}) = (\Phi^{-1}(P(M_1 > m_1)), \ldots, \Phi^{-1}(P(M_n > m_n)))_N$$

where $\Phi$ denotes the cumulative distribution function of the standard normal distribution and let Z denote the matrix of transformed observations $$\begin{pmatrix} z_{1,1} & \cdots & z_{1,n} \\ \vdots & & \vdots \\ z_{N,1} & \cdots & z_{N,n} \end{pmatrix}$$

The tail probabilities $P(M_i < m_i)$ may be used in place of the tail probabilities $P(M_i > m_i)$.

3. Compute the empirical correlation matrix $$\Sigma = \frac{Z^T Z}{N}$$

and the regularized empirical correlation matrix $\Sigma^\delta = (1-\delta)\Sigma + \delta I$ where I denotes the n×n identity matrix.

4. Initialize the estimate of R by $$R_0 = \Sigma^\delta$$

Until convergence repeat $$R_{i+1} = \arg\min_M \left\{ tr(R_i^{-1} M) + tr\left(M^{-1} \Sigma^\delta\right) + \lambda \|P * M\|_1 \right\}$$

where P is the penalty matrix with zeros on the diagonal and ones everywhere else and where the solution to the minimization problem is computed using Backtracking ISTA (Algorithm 4).

Anomaly Detection

Let R denote the estimate of the correlation matrix of the Gaussian copula that describes the dependencies of the exceedance probabilities $P(M_i > m_i)$ computed in the model fitting step. Given observations $m_1, \ldots, m_n$ 1. Calculate the exceedance probabilities $$P(M_1 > m_1), \ldots, P(M_n > m_n).$$

2. Discard all observations such that the exceedance probability $P(M_i > m_i)$ exceeds the threshold $p_{thresh}$ to get a new restricted set of observations $\tilde{m}_1, \ldots, \tilde{m}_{n'}$, $n' \leq n$.
3. Compute the restricted set of transformed variables $$z_1, \ldots, z_{n'} = \Phi^{-1}(P(\tilde{M}_1 > \tilde{m}_1)), \ldots, \Phi^{-1}(P(\tilde{M}_n > \tilde{m}_{n'})).$$

4. Compute R', the correlation matrix of the restricted set of transformed variables $z_1, \ldots, z_{n'}$.
5. Find the permutation $\sigma$ of $\{1, \ldots, n'\}$ which has the property that for all $i \in \{1, \ldots, n'\}$ $$P(Z_{\sigma(i)} \leq z_{\sigma(i)} | Z_{\sigma(1)} = z_{\sigma(1)}, \ldots, Z_{\sigma(i-1)} = z_{\sigma(i-1)}) \leq P(Z_{\sigma(j)} \leq z_{\sigma(j)} | Z_{\sigma(1)} = z_{\sigma(1)}, \ldots, Z_{\sigma(i-1)} = z_{\sigma(i-1)}) \quad (13)$$

for all $j \in \{1, \ldots, n'\}$.

6. Estimate the posterior probabilities $P^d(N)$ and $P^d(A)$ by $$P^d(N) = \prod_{i=1}^{n'} \frac{\pi(N)P_{\sigma(i)}}{\pi(N)P_{\sigma(i)} + \pi(A)}$$

$$P^d(A) = 1 - \prod_{i=1}^{n'} \frac{\pi(N)P_{\sigma(i)}}{\pi(N)P_{\sigma(i)} + \pi(A)}$$

where $P_{\sigma(i)}$ denotes $$P(Z_{\sigma(i)} \leq z_{\sigma(i)} | Z_{\sigma(1)} = z_{\sigma(1)}, \ldots, Z_{\sigma(i-1)} = z_{\sigma(i-1)}).$$

A Bayesian Algorithm for Anomaly Detection

The ideas in the sections above will now be tied together and an algorithm for detecting anomalous behavior in network devices based on monitoring a collection of behavioral metrics will be detailed.

Algorithm 8

Assume that one has a set of behavioral metrics $M_1, \ldots, M_n$ and that the conditions of Assumption 1 hold. Let $\pi(N)$ and $\pi(A)$ denote the prior probabilities that the behavior generating the value of a behavioral metric is normal or anomalous respectively, $p_{thresh}$ denote the exceedence probability threshold, $0<\delta<1$ denote the regularization parameter and $\lambda>0$ the lasso penalty.

Model Fitting

Given an historical sequence of observations of the values of the metrics $M_1, \ldots, M_n$ 1. for each i use a suitable POT fitting method to find
    a threshold $u_i$.
    an estimate $\hat{P}(M_i>u_i)$ of the tail probabilities (1).
    an estimate $\hat{\xi}_i, \hat{\sigma}_i$ of the parameters of the GPD that describes the conditional distribution $P(M_i-u_i|M_i>u_i)$.

2. Let $$(P(M_1 > m_1), \ldots, P(M_n > m_n))_1$$
$$\vdots$$
$$(P(M_1 > m_1), \ldots, P(M_n > m_n))_N$$

denote the sequence of values of exceedance probabilities obtained by applying the POT models obtained in step 8 to the historical sequence of observations of the values of the metrics $M_1, \ldots, M_n$.

3. Compute the sequence of transformed variables $$(z_{1,1}, \ldots, z_{1,n}) = (\Phi^{-1}(P(M_1 > m_1)), \ldots, \Phi^{-1}(P(M_n > m_n)))_1$$
$$\vdots$$
$$(z_{N,1}, \ldots, z_{N,n}) = (\Phi^{-1}(P(M_1 > m_1)), \ldots, \Phi^{-1}(P(M_n > m_n)))_N$$

where $\Phi$ denotes the cumulative distribution function of the standard normal distribution and let Z denote the matrix of transformed observations $$\begin{pmatrix} z_{1,1} & \cdots & z_{1,n} \\ \vdots & & \vdots \\ z_{N,1} & \cdots & z_{N,n} \end{pmatrix}$$

4. Compute the empirical correlation matrix $$\Sigma = \frac{Z^T Z}{N}$$

and the perturbed empirical correlation matrix $\Sigma^\delta = (1-\delta)\Sigma + \delta I$ where I denotes the n×n identity matrix.

5. Initialize the estimate of R by $$R_0 = \Sigma^\delta$$

Until convergence repeat $$R_{i+1} = \arg\min_M \left\{ tr(R_i^{-1}M) + tr\left(M^{-1}\sum^\delta\right) + \lambda \|P * M\|_1 \right\}$$

where P is the penalty matrix with zeros on the diagonal and ones everywhere else and where the solution to the minimization problem is computed using Backtracking ISTA (Algorithm 4).

Anomaly Detection

Let R denote the estimate of the correlation matrix of the Gaussian copula that describes the dependencies of the exceedance probabilities $P(M_i>m_i)$ computed in the model fitting part of the system. Given observations $m_1, \ldots, m_n$ of the behavioral metrics $M_1, \ldots, M_n$ 1. For each i compute the tail probability $P(M_i>m_i)$ using the empirical distribution of the historical observations of $M_i$ if $m_i \leq u_i$ and $$\hat{P}(M_i>u_i)F_{\hat{\xi}_i,\hat{\sigma}_i}(m_i-u_i)$$

otherwise.

2. Discard all observations such that the exceedance probability $P(M_i>m_i)$ exceeds the threshold $p_{thresh}$ to get a new restricted set of observations $\tilde{m}_1, \ldots, \tilde{m}_{n'}$, $n' \leq n$.

3. Compute the restricted set of transformed variables $$z_1, \ldots, z_{n'} = \Phi^{-1}(P(\tilde{M}_1 > \tilde{m}_1)), \ldots, \Phi^{-1}(P(\tilde{M}_n > \tilde{m}_n)).$$

4. Compute R', the correlation matrix of the restricted set of transformed variables $z_1, \ldots, z_{n'}$.

5. Find the permutation $\sigma$ of $\{1, \ldots, n'\}$ which has the property that for all $i \in \{1, \ldots, n'\}$ $$P(Z_{\sigma(i)} \leq z_{\sigma(i)} | Z_{\sigma(1)} = z_{\sigma(1)}, \ldots, Z_{\sigma(i-1)} = z_{\sigma(i-1)}) \leq P(Z_{\sigma(j)}$$
$$\leq z_{\sigma(j)} | Z_{\sigma(1)} = z_{\sigma(1)}, \ldots, Z_{\sigma(i-1)} = z_{\sigma(i-1)}) \quad (14)$$

for all $j \in \{i+1, \ldots, n'\}$.

6. Estimate the posterior probabilities $P^d(N)$ and $P^d(A)$ by $$P^d(N) = \prod_{i=1}^{n'} \frac{\pi(N)P_{\sigma(i)}}{\pi(N)P_{\sigma(i)} + \pi(A)}$$

$$P^d(A) = 1 - \prod_{i=1}^{n'} \frac{\pi(N)P_{\sigma(i)}}{\pi(N)P_{\sigma(i)} + \pi(A)}$$

where $P_{\sigma(i)}$ denotes $$P(Z_{\sigma(i)} \leq z_{\sigma(i)} | Z_{\sigma(1)} = z_{\sigma(1)}, \ldots, Z_{\sigma(i-1)} = z_{\sigma(i-1)}).$$

A Method for Representing Bayesian Posterior Probabilities

An approach to representing probabilities that allows the outputs of Bayesian anomaly detection algorithms to be presented to users in an intuitive and easily understandable form is now provided. The difficulty with using posterior probabilities to assess the level of anomalousness of events and how this difficulty may be overcome by using the so called weight of evidence will first be discussed. Then how one may use the weight of evidence to build a framework for representing probabilities that allows the user of an anomaly alert system to easily rank the level of anomalousness of different alerts and identify those which require further action is considered. Furthermore this framework provides a natural way for the user to specify and control the rate of false alerts.

The Weight of Evidence of a Posterior Probability

In order to understand the difficulties the users of a Bayesian anomaly alert system may face in interpreting its output consider the following scenario. Suppose that an anomaly alert system assigns prior probabilities $\pi(N)$ and $\pi(A)$ to the chances of a device being in a normal or anomalous state respectively. The posterior probability that the device is in an anomalous state given the observation of some event E will then be given by $$P(A \mid E) = \frac{\pi(A)P(E \mid A)}{\pi(N)P(E \mid N) + \pi(A)P(E \mid A)} \quad (15)$$

$$= \frac{1}{\frac{\pi(N)P(E \mid N)}{\pi(A)P(E \mid A)} + 1}.$$

Now consider how the posterior $P(A|E)$ varies with the Bayes factor $$\frac{P(E \mid A)}{P(E \mid N)}.$$

Suppose that the value of the Bayes factor is such that the corresponding posterior $P(A|E)$ is equal to 0.99. An increase of the Bayes factor by a factor of 10 will cause the value of the posterior to increase to roughly 0.999. Similarly an increase of the Bayes factor by a factor of 100 will cause the value of the posterior to increase to only approximately 0.9999. Clearly it is the case that the larger the posterior probability the more difficult it is to differentiate between the significance of different alerts.

It follows from the above discussion that the natural measure of anomalousness is not the posterior but the Bayes factor $$\frac{P(E \mid A)}{P(E \mid N)}.$$

The question then is what scaling to use to represent the Bayes factor. Intuitively one would expect a change in the Bayes factor by a factor of 10 to lead to the same change in the level of significance of the alert regardless of the actual absolute values of the Bayes factor. Therefore one way of representing the level of anomalousness to the user of an anomaly alert system is to report the so called weight of evidence $$\log_{10}\left(\frac{P(E \mid A)}{P(E \mid N)}\right).$$

How the weight of evidence may be used to build a framework for representing and interpreting probabilities generated by anomaly alert systems will now be discussed.

A Weight of Evidence Based Alert Framework

Recall from (15) that the posterior probability of an entity being anomalous is determined by the quantity $$\frac{\pi(A)P(E \mid A)}{\pi(N)P(E \mid N)}.$$

Thus to determine the level of anomalousness one needs to know the value of the prior probabilities. However in practice the user of an anomaly alert system does not need the absolute level of anomalousness of each event but instead wishes only to be able to identify those alerts which are most significant. It follows that what is important is the relative weight of evidence of any pair of events. From (15) it follows that the relative weight of evidence of any two events E and E' is $$\log_{10}\left(\frac{P(E \mid A)}{P(E \mid N)}\right) - \log_{10}\left(\frac{P(E' \mid A)}{P(E' \mid N)}\right) = \log_{10}\left(\frac{\pi(A)}{\pi(N)}\right) +$$

$$\log_{10}\left(\frac{P(E \mid A)}{P(E \mid N)}\right) -$$

$$\log_{10}\left(\frac{\pi(A)}{\pi(N)}\right) -$$

$$\log_{10}\left(\frac{P(E' \mid A)}{P(E' \mid N)}\right)$$

$$= \log_{10}\left(\frac{\pi(A)P(E \mid A)}{\pi(N)P(E \mid N)}\right) -$$

$$\log_{10}\left(\frac{\pi(A)P(E' \mid A)}{\pi(N)P(E' \mid N)}\right).$$

The key observation is that the relative weight of evidence is independent of the choice of priors and so presents a way of comparing the relative importance of different events in a Bayesian context which is independent of the underlying modelling assumptions. Thus, while in the system described above, the prior probabilities are needed to compute the overall probability of a device being anomalous as described (see algorithm 8 and related preceding algorithms for example), the weight of evidence based method describes a way to give scores to events without ever having to compute or know the prior probabilities $\pi(N)$ and $\pi(A)$.

It would not be practical for the user of a system to have to compare every pair of alerts. Instead what one could do would be to compare the strength of each alert to some reference strength. Since a user is likely to only be interested in alerts that exceed the reference strength one can then choose the reference strength to achieve a desired false positive rate. In order to formalize this, the following assumption will be made.

Assumption 3

1. The consumer of the output of the anomaly alert system can tolerate (on average) no more than $N_{fp}$ false positives per day.

Using the conditions in Assumption 3 the following algorithm can be formulated.

Algorithm 9

Assume the conditions of Assumption 3 hold.

1. Given a sequence of historical observed events $E_1, \ldots, E_N$ compute the average number of events per day $N_{eld}$.

2. Compute the $$1 - \frac{N_{fp}}{N_{e/d}} - th$$

empirical quantile of the posterior anomaly probabilities $P(A|E_1), \ldots, P(A|E_N)$. Denote this quantity $P(A)_{ref}$.

3. Given a new event E compute the relative weight of evidence of $P(A|E)$ with respect to the reference strength $P(A)_{ref}$. Denote this quantity by $R_{woe}(P(A|E), P(A)_{ref})$.

4. Return to the user the quantity $\max(R_{woe}(P(A|E), P(A)_{ref}), 0)$ to measure the significance of event E.

Finally it is observed that since many users may be using the significance score mostly to decide whether or not an event merits further attention it often makes sense to attenuate the significance score when it exceeds some level beyond which further investigation is inevitable. This can be done by either hard thresholding or by soft thresholding using the rescaled logistic function $$S(t) = \frac{1 - e^{-t}}{1 + e^{-t}}. \tag{16}$$

Moreover such output can then be rescaled to give the user a value lying in some easily interpreted range. In particular one can linearly map the thresholded significance score to the interval [0,100] thus presenting the user with a 'percentage' score of how anomalous an event is.

Algorithm 10

Assume the conditions of Assumption 3 hold.

1. Choose a scale $\alpha$ and a cutoff $\beta$ such that $\alpha, \beta \in (0, \infty)$.
2. Given a sequence of historical observed events $E_1, \ldots, E_N$ compute the average number of events per day $N_{e/d}$.
3. Compute the $$1 - \frac{N_{fp}}{N_{e/d}} - th$$

empirical quantile of the posterior anomaly probabilities $P(A|E_1), \ldots, P(A|E_N)$. Denote this quantity $P(A)_{ref}$.

4. Given a new event E compute the relative weight of evidence of $P(A|E)$ with respect to the reference strength $P(A)_{ref}$. Denote this quantity by $R_{woe}(P(A|E), P(A)_{ref})$.

5. Compute $R_{woe}^+(P(A|E), P(A)_{ref}) = \max(R_{woe}(P(A|E), P(A)_{ref}), 0)$.

6. Return to the user either the quantity $$\alpha\left(\frac{\min(R_{woe}^+(P(A|E), P(A)_{ref}), \beta)}{\beta}\right)$$

or the quantity $$\alpha S\left(\frac{R_{woe}^+(P(A|E), P(A)_{ref})}{\beta}\right)$$

where S is the logistic function defined in (16) to measure the significance of event E.

An Anomaly Alert System for Cyber Threat Detection

In this section the ideas of the preceding sections are combined to describe an anomaly alert system for detecting cyber threats in computer networks. The anomaly alert system consists of three main parts; a model fitting system, the anomaly detection system and a user alert system.

The following example assumptions are made about the environment in which the anomaly alert system is to be deployed (other sets of assumptions may also be used):

There is a computer network with a number of devices to be monitored for anomalous behavior.

The data about the network traffic being generated by these devices is being collected by a network traffic monitoring system.

The output of the network monitoring system is used to generate for each device a set of behavioral metrics $M_1, \ldots, M_n$, the behavioral metrics may be either network metrics or derived metrics.

Historical values of the metrics are available to the system for training.

New values of the behavioral metrics are fed into the system in real time for anomaly detection and alerting.

The user of the anomaly alert system may tolerate (on average) a fraction of false positives no greater than p, $0 < p < 1$.

The user of the anomaly alert system has a cutoff $\beta$ for alert strengths and desires to see the strength of alerts displayed on a scale $[0, \alpha]$ for some $\alpha, \beta > 0$.

Specific descriptions of each of the three parts of the anomaly alert system will now be given.

Model Fitting System 170

It is assumed that historical observations 150 of the behavioral metrics $M_1, \ldots, M_n$ for all the devices on the network are available.

1. For each metric $M_i$ use a suitable POT fitting method to find
   a threshold $u_i$.
   an estimate $\hat{P}(M_i > u_i)$ of the tail probabilities (1).
   an estimate $\hat{\xi}_i, \hat{\sigma}_i$ of the parameters of the GPD that describes the conditional distribution $P(M_i - u_i | M_i > u_i)$.

When fitting the parameters of the POT method the following may be taken into consideration.

For some metrics one may want to model the tail probabilities (1) using a restricted set of the set of GPDs. In particular when the values that a metric can take are unbounded one may want to assume that the probabilities $P(M > u_i)$ belong to either the Gumbel or Fréchet family of distributions (equivalent to assuming that $\xi \geq 0$).

When computing the distribution of the tail probabilities (1) care must be taken to avoid having the estimates of the tail parameters skewed by any outliers in the observations. This can be done by employing some kind of M-estimator. Alternatively, this may be achieved by discarding a fixed number of the largest observations or a fixed fraction of the largest observations where the choice of the above is user driven.

One may model the tail probabilities (1) separately for some devices. As well as this one may wish to group certain subsets of the network devices together and build a single model for the tail probabilities of the devices in the subset based on the union of the observations of the metric for each individual device in the group. The groups may be manually specified by a user, may be created by grouping all devices of a certain type e.g. all desktops on a subnet or may be determined algorithmically by applying a clustering algorithm to some feature set.

2. Compute the sequence of values of exceedance probabilities $$(P(M_1 > m_1), \ldots, P(M_n > m_n))_1$$
$$\vdots$$
$$(P(M_1 > m_1), \ldots, P(M_n > m_n))_N$$

obtained by applying the POT models obtained in step 1 to the historical sequence of observations of the values of the metrics $M_1, \ldots, M_n$, where N denotes the number of observations of the metrics available to the model fitting part of the system. These may be obtained in one of two ways.

Cross validation. In this approach the set of historical observations of the metrics S is split into K disjoint sets. For each set of observations $S_k$, $1 \leq k \leq K$, the parameters of the POT models are computed as detailed above using the remaining observations $S \setminus S_k$ and then used to compute the values $P(M_i > m_i)$ for the observations in $S_k$. Doing this for all sets $S_1, \ldots, S_K$ gives a collection of observations of $P(M_i > m_i)$ that may be used to model their dependency relationship.

Using historical values of the $P(M_i > m_i)$. In this approach one simply records the values of the random variables $P(M_i > m_i)$ for some time window after the parameters of the POT models were last computed. These values can then be used to model the dependency relationships.

The cross validation approach may be more computationally expensive whereas the second approach may increase the memory requirements of the system. If CPU usage rather than memory is the most commonly encountered resource constraint, the second method listed above may be used.

3. Compute the sequence of transformed variables $$(z_{1,1}, \ldots, z_{1,n}) = (\Phi^{-1}(P(M_1 > m_1)), \ldots, \Phi^{-1}(P(M_n > m_n)))_1$$
$$\vdots$$
$$(z_{N,1}, \ldots, z_{N,n}) = (\Phi^{-1}(P(M_1 > m_1)), \ldots, \Phi^{-1}(P(M_n > m_n)))_N$$

where $\Phi$ denotes the cumulative distribution function of the standard normal distribution and let Z denote the matrix of transformed observations $$\begin{pmatrix} z_{1,1} & \cdots & z_{1,n} \\ \vdots & & \vdots \\ z_{N,1} & \cdots & z_{N,n} \end{pmatrix}$$

4. Compute the empirical correlation matrix $$\Sigma = \frac{Z^T Z}{N}$$

and the regularized empirical correlation matrix $\Sigma^\delta = (1-\delta)\Sigma + \delta I$ where I denotes the n×n identity matrix. The regularization parameter $\delta$ should take values in (0,1). In practice $\delta = 0.1$ may be used.

5. Initialize the estimate of R by $$R_0 = \Sigma^\delta$$

Until convergence repeat $$R_{i+1} = \arg\min_M \left\{ tr(R_i^{-1} M) + tr\left(M^{-1} \sum^\delta\right) + \lambda \|P * M\|_1 \right\}$$

where P is the penalty matrix with zeros on the diagonal and ones everywhere else, where $\lambda > 0$ is a user chosen lasso penalty, and where the solution to the minimization problem is computed using Backtracking ISTA (Algorithm 4).

6. Let $N_{fp}$ be the user specified daily false positive rate. From the number of historical observations of the metrics $M_1, \ldots, M_n$ compute the expected number of observations per day $N_{old}$.

Choose $$\pi(N) = 1 - \frac{N_{fp}}{N_{old}}$$

and $$\pi(A) = \frac{N_{fp}}{N_{old}}.$$

Set the reference anomaly posterior $P(A)_{ref}$ to be equal to the $$1 - \frac{N_{fp}}{N_{old}}$$

-th quantile of the distribution of the random variable $$1 - \prod \frac{\pi(N) P_{\sigma(i)}}{\pi(N) P_{\sigma(i)} + \pi(A)} \qquad (17)$$

where $\sigma$ is as defined in (13) and where $P_{\sigma(i)}$ denotes $P(Z_{\sigma(i)} \leq z_{\sigma(i)} | Z_{\sigma(1)} = z_{\sigma(1)}, \ldots, Z_{\sigma(i-1)} = z_{\sigma(i-1)})$ and where $z_1, \ldots, z_M$ are the transformed variables defined in (11) with the dependency structure described by the Gaussian copula (10) with correlation matrix R as computed in the previous step.

The quantiles of (17) can be estimated by Monte Carlo simulation in order to find an estimate of the exact value of the reference posterior $P(A)_{ref}$. Alternatively if $N_{fp} \ll N_{old}$ then by using the Bonferroni correction principle and approximating R by the identity matrix it follows that $$P\left(\left(1 - \prod \frac{\pi(N) P_{\sigma(i)}}{\pi(N) P_{\sigma(i)} + \pi(A)}\right) > \frac{n}{n+1}\right) \approx \frac{N_{fp}}{N_{old}}.$$

where $\sigma$ is as defined in (13) and where $P_{\sigma(i)}$ denotes $P(Z_{\sigma(i)} \leq z_{\sigma(i)} | Z_{\sigma(1)} = z_{\sigma(1)}, \ldots, Z_{\sigma(i-1)} = z_{\sigma(i-1)})$ Optionally, $$\frac{n}{n+1}$$

can be used as an approximation to the reference posterior to avoid exact computation of the quantiles of (17).

7. Select the exceedance probability threshold $p_{thresh}$ so that the corresponding posterior is negligible. In practice $p_{thresh}$ may be set equal to $\alpha\pi(A)$ for some $\alpha \in [10, 100]$.

Anomaly Detection System 180

Let R be the Gaussian copula correlation matrix computed by the model fitting part of the system. Given values $m_1, \ldots, m_n$ of the behavioral metrics $M_1, \ldots, M_n$ for a device d. These may be new observations 160.

1. Find the POT models that correspond to device d and for each i compute the tail probability $P(M_i > m_i)$ using the empirical distribution of the historical observations of $M_i$ if $m_i \leq u_i$ and $$\hat{P}(M_i > u_i) F_{\hat{\xi}_i, \hat{\sigma}_i}(m_i - u_i)$$

otherwise.

2. Discard all observations such that the exceedance probability $P(M_i > m_i)$ exceeds the threshold $p_{thresh}$ to get a new restricted set of observations $\tilde{m}_1, \ldots, \tilde{m}_{n'}$, $n' \leq n$.

3. Compute the restricted set of transformed variables $$z_1, \ldots, z_{n'} = \Phi^{-1}(P(\tilde{M}_1 > \tilde{m}_1)), \ldots, \Phi^{-1}(P(\tilde{M}_{n'} > \tilde{m}_{n'})).$$

4. Compute R', the correlation matrix of the restricted set of transformed variables $z_1, \ldots, z_{n'}$.

5. Find the permutation $\sigma$ of $\{1, \ldots, n'\}$ which has the property that for all $i \in \{1, \ldots, n'\}$ $$\begin{aligned} P(Z_{\sigma(i)} &\leq z_{\sigma(i)} | Z_{\sigma(1)} = z_{\sigma(1)}, \ldots, Z_{\sigma(i-1)} = z_{\sigma(i-1)}) \leq P(Z_{\sigma(j)} \\ &\leq z_{\sigma(j)} | Z_{\sigma(1)} = z_{\sigma(1)}, \ldots, Z_{\sigma(i-1)} = z_{\sigma(i-1)}) \end{aligned} \quad (18)$$

for all $j \in \{i+1, \ldots, n'\}$.

6. Estimate the posterior probabilities $P^d(N)$ and $P^d(A)$ by $$P^d(N) = \prod_{i=1}^{n'} \frac{\pi(N) P_{\sigma(i)}}{\pi(N) P_{\sigma(i)} + \pi(A)}$$

$$P^d(A) = 1 - \prod_{i=1}^{n'} \frac{\pi(N) P_{\sigma(i)}}{\pi(N) P_{\sigma(i)} + \pi(A)}$$

where $P_{\sigma(i)}$ denotes $$P(Z_{\sigma(i)} \leq z_{\sigma(i)} | Z_{\sigma(1)} = z_{\sigma(1)}, \ldots, Z_{\sigma(i-1)} = z_{\sigma(i-1)}).$$

7. Post the value $P^d(A)$ to the user alert system.

User Alert System 190

Given a posterior anomaly probability $P^d(A)$ for a device.

1. Compute the relative weight of evidence of $P^d(A)$ with respect to the reference posterior anomaly probability $P(A)_{ref}$ $$R_{woe}(P^d(A), P(A)_{ref}) = \log_{10}\left(\frac{P^d(A)}{1 - P^d(A)}\right) - \log_{10}\left(\frac{P(A)_{ref}}{1 - P(A)_{ref}}\right).$$

2. Return to the user 210 the anomaly score $$\alpha S\left(\frac{\max(R_{woe}(P^d(A), P(A)_{ref}), 0)}{\beta}\right)$$

where S is the rescaled logistic function defined in (16).

The various methods described above may be implemented by a computer program product. The computer program product may include computer code arranged to instruct a computer or an arrangement of computers to perform the functions of one or more of the various methods described above. The computer program and/or the code for performing such methods may be provided to an apparatus, such as a computer, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer may be configured in accordance with such code to perform one or more processes in accordance with the various methods discussed herein. Such an apparatus may take the form of a data processing system. Such a data processing system may be a distributed system. For example, such a data processing system may be distributed across a network.

The invention claimed is:

1. A method for an anomalous behavior detection system having a mathematical model of what is considered to be normal behavior for a device in a computer system that is used in a detection of anomalous behavior of the device of the computer system, the method arranged to be performed by a processing system, the method comprising:
    deriving values, $m_1, \ldots, m_N$, of a metric, M, representative of data associated with the device;
    modelling a distribution of the values of the metric;
    determining, in accordance with the distribution of the values of the metric, a probability of observing a more extreme value of the metric than a given value, m, of the metric, wherein the probability and the distribution of the values of the metric are used by the mathematical model of what is considered to be normal behavior for that device to determine whether the device is behaving anomalously;
    determining, in accordance with the probability of observing the more extreme value, and a probabilistic model of the device, a posterior probability of the given value, m, being a result of anomalous behavior of the device, wherein the posterior probability is used to determine whether the device is behaving anomalously;
    determining posterior probabilities for a plurality of given values, $m_i$, of a plurality of metrics, $M_i$, wherein the metrics, $M_i$, are representative of data associated with the device, where levels of anomalousness of values of the plurality of metrics for the device are combined to produce a measure of an overall posterior probability of the device being in an anomalous state; and
    in accordance with the posterior probabilities for the given values, $m_i$, determining an overall posterior probability of the device being in the anomalous state, wherein the overall posterior probability is used to determine whether the device is behaving anomalously;
    wherein a combined posterior probability that the device is in an anomalous state, $P^d(A)$, is given by $$P^d(A) = 1 - \Pi \frac{\pi(N)P(M_i > m_i)}{\pi(N)P(M_i > m_i) + \pi(A)}$$

where π(A) and π(N) denote prior probabilities that the given value, mi, of the metric, $M_i$, is the result of anomalous or normal behavior of the device, respectively, and $P(M_i > m_i)$ is the probability of $M_i > m_i$.

2. The method of claim 1, further comprising:
maintaining one or more mathematical models to build and maintain dynamic, ever-changing models of the normal behavior of each device monitored by the anomalous behavior detection system, based on the comparison of the metrics associated with a corresponding device, where two or more devices are monitored by the anomalous behavior detection system.

3. The method of claim 2, wherein the suitable quantile point is a median.

4. The method of claim 1, wherein the probabilistic model is a Bayesian model.

5. The method of claim 4, wherein a logarithm of a Bayes factor, $$\log\left(\frac{P(A)}{1 - P(A)}\right),$$

is used to describe a measure of anomalousness of the device, where P(A) is the posterior probability.

6. The method of claim 5, wherein the measure of anomalousness of the device is determined relative to a reference measure of anomalousness.

7. The method of claim 6, wherein the measure of anomalousness of the device is attenuated above a given level.

8. The method of claim 1, wherein the distribution of the values of the metric is modeled using extreme value theory.

9. The method of claim 1, wherein the distribution of the values of the metric is modeled as a generalized Pareto, Gumbel or Fréchet distribution.

10. The method of claim 1, wherein the probability of observing a more extreme value is modeled using a peaks over thresholds method.

11. The method of claim 1, further comprising:
utilizing an anomaly alert system that generates a notification when the device is behaving anomalously, where the anomaly alert system is configured to rank an importance of different alerts being generated.

12. The method of claim 1, wherein the detection of anomalous behavior is performed using a subset, $M_1, \ldots, M_{n'}$, of the metrics, $M_1, \ldots, M_n$, where n'≤n.

13. The method of claim 12, wherein the subset, $M_1, \ldots, M_{n'}$, of the metrics, $M_1, \ldots, M_n$, where n'≤n, is chosen by removing values for which $P(M_i > m_i)$ exceeds a threshold probability, where $P(M_i > m_i)$ is the probability of $M_i > m_i$.

14. The method of claim 12, wherein the subset, $M_1, \ldots, M_{n'}$, of the metrics, $M_1, \ldots, M_n$, where n'≤n, is chosen by removing values for which $P(M_i < m_i)$ exceeds a threshold probability, where $P(M_i < m_i)$ is the probability of $M_i < m_i$.

15. A method for an anomalous behavior detection system having a mathematical model of what is considered to be normal behavior for a device in a computer system that is used in a detection of anomalous behavior of the device of the computer system, the method arranged to be performed by a processing system, the method comprising:
deriving values, $m_1, \ldots, m_N$, of a metric, M, representative of data associated with the device;
modelling a distribution of the values of the metric;
determining, in accordance with the distribution of the values of the metric, a probability of observing a more extreme value of the metric than a given value, m, of the metric, wherein the probability and the distribution of the values of the metric are used by the mathematical model of what is considered to be normal behavior for that device to determine whether the device is behaving anomalously, and
determining, in accordance with the probability of observing the more extreme value, and the mathematical model of the device, a posterior probability of the given value, m, being the result of anomalous behavior of the device, wherein the posterior probability is used to determine whether the device is behaving anomalously, wherein the posterior probability that the given value m of the metric M is the result of anomalous behavior of the device, $P^M(A)$, is given by:

$$P^M(A) = \frac{\pi(A)}{\pi(N)P(M > m) + \pi(A)}$$

where π(A) and π(N) denote prior probabilities that the given value, m, of the metric, M, is the result of anomalous or normal behavior of the device, respectively, and P(M>m) is the probability of M>m.

16. The method of claim 15, further comprising calculating transformed variables, $z_1, \ldots, z_n$, wherein the transformed variables are such that:

$$z_1, \ldots, z_n = \Phi^{-1}(P(M_1 < m_1)), \ldots, \Phi^{-1}(P(M_n < m_n))$$

wherein Φ denotes a cumulative distribution function of a standard normal distribution and $P(M, <m_i)$ is a probability of observing a smaller value than the given value, $m_i$.

17. A method for an anomalous behavior detection system having a mathematical model of what is considered to be normal behavior for a device in a computer system that is used in a detection of anomalous behavior of the device of the computer system, the method arranged to be performed by a processing system, the method comprising:
deriving values, $m_1, \ldots, m_N$, of a metric, M, representative of data associated with the device;
modelling a distribution of the values of the metric;
determining, in accordance with the distribution of the values of the metric, a probability of observing a more extreme value of the metric than a given value, m, of the metric, wherein the probability and the distribution of the values of the metric are used by the mathematical model of what is considered to be normal behavior for that device to determine whether the device is behaving anomalously, and
determining, in accordance with the probability of observing the more extreme value, and the mathematical model of the device, a posterior probability of the given value, m, being the result of anomalous behavior of the device, wherein the posterior probability is used to determine whether the device is behaving anomalously, wherein the posterior probability that the given value m of the metric M is the result of anomalous behavior of the device, $P^M(A)$, is given by:

$$P^M(A) = \frac{\pi(A)}{\pi(N)P(M < m) + \pi(A)}$$

where $\pi(A)$ and $\pi(N)$ denote prior probabilities that the given value, m, of the metric, M, is the result of anomalous or normal behavior of the device, respectively, and $P(M<m)$ is the probability of $M<m$.

18. A method for an anomalous behavior detection system having a mathematical model of what is considered to be normal behavior for a device in a computer system that is used in a detection of anomalous behavior of the device of the computer system, the method arranged to be performed by a processing system, the method comprising:
    deriving values, $m_1, \ldots, m_N$, of a metric, M, representative of data associated with the device;
    modelling a distribution of the values of the metric;
    determining, in accordance with the distribution of the values of the metric, a probability of observing a more extreme value of the metric than a given value, m, of the metric, wherein the probability and the distribution of the values of the metric are used by the mathematical model of what is considered to be normal behavior for that device to determine whether the device is behaving anomalously;
    determining, in accordance with the probability of observing the more extreme value, and a probabilistic model of the device, a posterior probability of the given value, m, being a result of anomalous behavior of the device, wherein the posterior probability is used to determine whether the device is behaving anomalously;
    determining posterior probabilities for a plurality of given values, $m_i$, of a plurality of metrics, $M_i$, wherein the metrics, $M_i$, are representative of data associated with the device, where levels of anomalousness of values of the plurality of metrics for the device are combined to produce a measure of an overall posterior probability of the device being in an anomalous state;
    in accordance with the posterior probabilities for the given values, $m_i$, determining an overall posterior probability of the device being in the anomalous state, wherein the overall posterior probability is used to determine whether the device is behaving anomalously;
    wherein the metrics, $M_i$, are assumed to be statistically dependent, the statistical dependencies modeled using copulas; and
    calculating transformed variables, $z_1, \ldots, z_n$, wherein the transformed variables are such that $$z_1, \ldots, z_n = \Phi^{-1}(P(M_1 > m_1)), \ldots, \Phi^{-1}(P(M_n > m_n)).$$

wherein $\Phi$ denotes a cumulative distribution function of the standard normal distribution and $P(M_i > m_i)$ is the probability of observing a greater value than the given value, $m_i$;

wherein a combined posterior probability that the device is in an anomalous state, $P^d(A)$, is given by:

$$P^d(A) = 1 - \prod_{i=1}^{n} \frac{\pi(N) P_{\sigma(i)}}{\pi(N) P_{\sigma(i)} + \pi(A)}$$

where $P_{\sigma(i)}$ denotes $$P(Z_{\sigma(i)} \le z_{\sigma(i)} | Z_{\sigma(1)} = z_{\sigma(1)}, \ldots, Z_{\sigma(i-1)} = z_{\sigma(i-1)}),$$

Z denotes the transformed variables, $z_1, \ldots, z_n$, $\sigma$ denotes a permutation of the indexes i, $\{1, \ldots, n\}$ and $\pi(A)$ and $\pi(N)$ denote prior probabilities that the given value, $m_i$, of the metric, $M_i$, is a result of anomalous or normal behavior of the device.

19. The method of claim 18, wherein the permutation of indexes i, $\{1, \ldots, n\}$, maximizes the value of $P^d(A)$.

20. An anomalous behavior detection system, comprising a processor, an anomalous behavior detection system having a mathematical model of what is considered to be normal behavior for a first device in a computer system that is used in a detection of anomalous behavior of the first device of a computer system, and a non-transitory memory comprising computer readable code operable, which when executed by the processer that is configured to instruct a computing device to
    derive values, m_1, . . . , m_N, of a metric, M, representative of data associated with the first device;
    model a distribution of the values of the metric;
    determine, in accordance with the distribution of the values of the metric, a probability of observing a more extreme value of the metric than a given value, m, of the metric, wherein the probability and the distribution of the values of the metric are used by the mathematical model of what is considered to be normal behavior for the first device to determine whether the first device is behaving anomalously;
    maintain one or more mathematical models to build and maintain dynamic, ever-changing models of a normal behavior of each device monitored by the anomalous behavior detection system, based on a comparison of metrics associated with a corresponding device, where two or more devices, including the first device, are monitored by the anomalous behavior detection system, where the anomalous behavior detection system is configured to use the one or more mathematical models to determine whether each corresponding device is behaving anomalously;
    utilize an anomaly alert system that generates a notification when the first device is behaving anomalously, where the anomaly alert system is configured to rank an importance of different alerts being generated;
    determine, in accordance with the probability of observing the more extreme value, and a probabilistic model of the device, a posterior probability of the given value, m, being a result of anomalous behavior of the first device, wherein the posterior probability is used to determine whether the first device is behaving anomalously;
    determine posterior probabilities for a plurality of given values, $m_i$, of a plurality of metrics, $M_i$, wherein the metrics, $M_i$, are representative of data associated with the first device, where levels of anomalousness of values of the plurality of metrics for the first device are combined to produce a measure of an overall posterior probability of the first device being in an anomalous state;
    in accordance with the posterior probabilities for the given values, $m_i$, determine an overall posterior probability of the first device being in the anomalous state, wherein the overall posterior probability is used to determine whether the first device is behaving anomalously; and
    wherein a combined posterior probability that the first device is in an anomalous state, $P^d(A)$, is given by:

$$P^d(A) = 1 - \Pi \frac{\pi(N) P(M_i < m_i)}{\pi(N) P(M_i < m_i) + \pi(A)}$$

where $\pi(A)$ and $\pi(N)$ denote prior probabilities that the given value, $m_i$, of the metric, $M_i$, is the result of anomalous or normal behavior of the first device, respectively, and $P(M_i < m_i)$ is the probability of $M_i < m_i$.

* * * * *